United States Patent
Lin et al.

(10) Patent No.: US 8,384,841 B2
(45) Date of Patent: Feb. 26, 2013

(54) LIQUID CRYSTAL DISPLAY MODULE

(75) Inventors: Yue-Feng Lin, Taichung (TW);
Tsung-Hsien Chuang, Kaohsiung (TW);
Tsung-Fu Cheng, Hsinchu County (TW); Chang-Ho Shen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 280 days.

(21) Appl. No.: 12/975,312

(22) Filed: Dec. 21, 2010

(65) Prior Publication Data

US 2012/0099044 A1    Apr. 26, 2012

(30) Foreign Application Priority Data

Oct. 25, 2010 (TW) .............................. 99136352 A

(51) Int. Cl.
*G02F 1/1333* (2006.01)
*G02F 1/1335* (2006.01)

(52) U.S. Cl. .......................................... 349/58; 349/61
(58) Field of Classification Search .................... 349/58, 349/61
See application file for complete search history.

(56) References Cited

U.S. PATENT DOCUMENTS

| | | | |
|---|---|---|---|
| 5,668,695 A * | 9/1997 | Nakamura et al. | 361/679.26 |
| 6,587,166 B1 * | 7/2003 | Lee et al. | 349/58 |
| 7,583,349 B2 * | 9/2009 | Sugiyama | 349/150 |
| 7,852,425 B2 * | 12/2010 | Nishimura | 349/58 |

FOREIGN PATENT DOCUMENTS

| | | |
|---|---|---|
| JP | 2000-181371 | 6/2000 |
| JP | 2003-066483 | 3/2003 |
| JP | 2005-352305 | 12/2005 |
| TW | 469366 | 12/2001 |
| TW | 476908 | 2/2002 |
| TW | 485259 | 5/2002 |
| TW | 500242 | 8/2002 |
| TW | 200402577 | 2/2004 |
| TW | 582562 | 4/2004 |
| TW | 200410013 | 6/2004 |
| TW | M333752 | 6/2008 |
| TW | 201009450 | 3/2010 |
| TW | 201020619 | 6/2010 |
| TW | 201023723 | 6/2010 |

* cited by examiner

*Primary Examiner* — Mike Qi
(74) *Attorney, Agent, or Firm* — Jianq Chyun IP Office

(57) ABSTRACT

A liquid crystal display (LCD) module includes a back bezel, a backlight module, a frame, an LCD panel, a circuit board, an assembling element, and a gasket. The frame has a top part and a bottom part opposite to the top part, and the bottom part faces the back bezel. The circuit board is configured on the top part of the frame and has a first surface and a second surface opposite to the first surface. The second surface faces the frame, and the circuit board has a ground area on the second surface. The assembling element pierces through the frame and connects the frame to the back bezel. The gasket leans against the ground area of the circuit board and the assembling element to form a conductive path from the ground area, the gasket, the assembling element to the back bezel.

12 Claims, 3 Drawing Sheets

LIQUID CRYSTAL DISPLAY MODULE

CROSS-REFERENCE TO RELATED APPLICATION

This application claims the priority benefit of Taiwan application serial no. 99136352, filed on Oct. 25, 2010. The entirety of the above-mentioned patent application is hereby incorporated by reference herein and made a part of this specification.

BACKGROUND OF THE INVENTION

1. Field of the Invention

The invention relates to a liquid crystal display (LCD) module. More particularly, the invention relates to an LCD module that can be easily miniaturized.

2. Description of Related Art

A conventional LCD module includes a backlight module located on a surface of a back bezel, an LCD panel located on the backlight module, a flexible printed circuit (FPC) connected to the LCD panel, and a printed circuit board (PCB) connected to the FPC.

To prevent electromagnetic interference (EMI), the PCB is often electrically connected to the back bezel, such that the PCB is grounded to prevent the EMI.

According to the related art, a method of arranging the PCB includes following steps. The PCB is configured on a bottom surface of the back bezel, and the PCB is electrically connected to the back bezel through a locking element, such that the PCB is grounded. However, under said arrangement, the FPC connected to the PCB and the LCD panel needs to detour around the back bezel and the backlight module located on the back bezel, which leads to an increase in the required length of the FPC and the material costs of the FPC. Besides, the FPC is required to be bent over and over under said arrangement, so as to connect the PCB located on the bottom surface of the back bezel. Thereby, the FPC is more likely to be damaged.

In another method of arranging the PCB, the PCB is configured at a side of the backlight module, and the PCB is electrically connected to the back bezel through a locking element, such that the PCB is grounded. Nonetheless, the PCB is configured at the side of the backlight module under said arrangement, and therefore the thickness of the LCD module is subject to the dimension of the PCB, which is unfavorable to miniaturization of the LCD module. On the other hand, the FPC needs to detour around one edge of the backlight module to connect the PCB, which increases the possibility of damaging the FPC and reduces the assembly yield of the LCD module.

Under said two arrangements, the PCB is fastened onto the back bezel by the locking element, and therefore the FPC is likely to be peeled off from the PCB during the vibration test of the LCD module. Accordingly, how to ground the PCB through the back bezel without impairing the miniaturization and the assembly yield of the LCD module now becomes an important issue to be resolved.

SUMMARY OF THE INVENTION

The invention is directed to an LCD module in which the device arrangement is rather conducive to miniaturization of the LCD module. In addition, the LCD module of the invention has low costs, and a FPC in the LCD module is barely peeled off from a PCB.

The invention provides an LCD module that includes a back bezel, a backlight module, a frame, an LCD panel, a circuit board, an assembling element, and a gasket. The backlight module is configured on the back bezel. The frame is configured on the back bezel and surrounds the backlight module. Besides, the frame has a top part and a bottom part opposite to the top part, and the bottom part faces the back bezel. The LCD panel is configured above the backlight module, and the top part of the frame leans against an edge of the LCD panel. The circuit board is configured on the top part of the frame and has a first surface and a second surface opposite to the first surface. The second surface faces the frame, and the circuit board has a ground area on the second surface. The assembling element pierces through the frame and connects the frame to the back bezel. The gasket leans against the ground area of the circuit board and the assembling element to form a conductive path from the ground area, the gasket, the assembling element to the back bezel.

Based on the above, in the LCD module of the invention, the circuit board is configured on the top part of the frame, and the circuit board is grounded through the conductive path from the ground area, the gasket, the assembling element to the back bezel. Thereby, the LCD module of the invention can be easily miniaturized, and the issues of EMI and the FPC which is peeled off from the PCB are rather unlikely to occur. Besides, the circuit board leans against the top part of the frame leaning against the LCD panel, and thus the length of the electrical connection element connecting the circuit board and the LCD panel need not be overly long. As such, the material costs of the electrical connection element can be effectively reduced.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
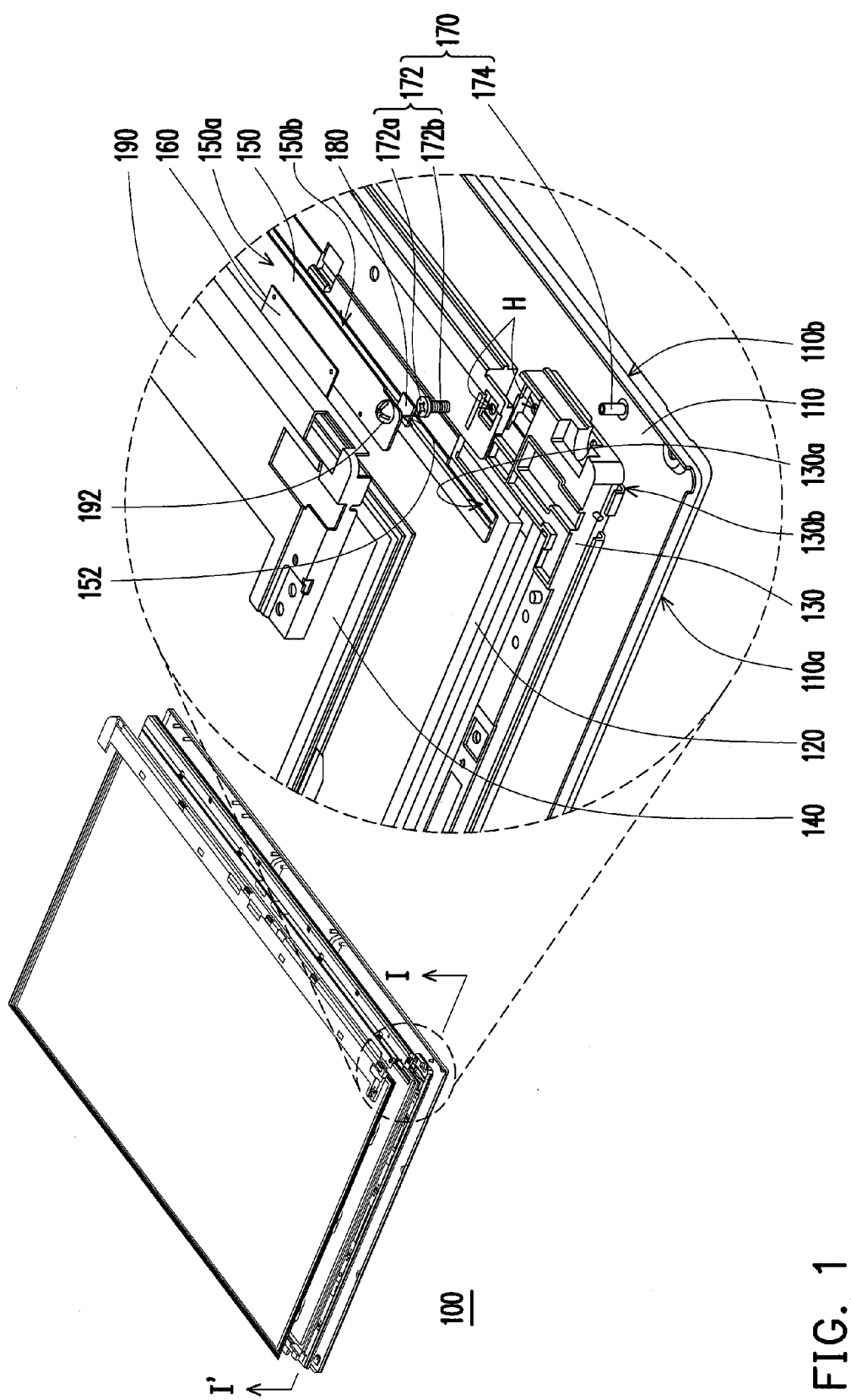
FIG. 1 is a three-dimensional exploded view illustrating an LCD module according to an embodiment of the invention.
Figure 2:
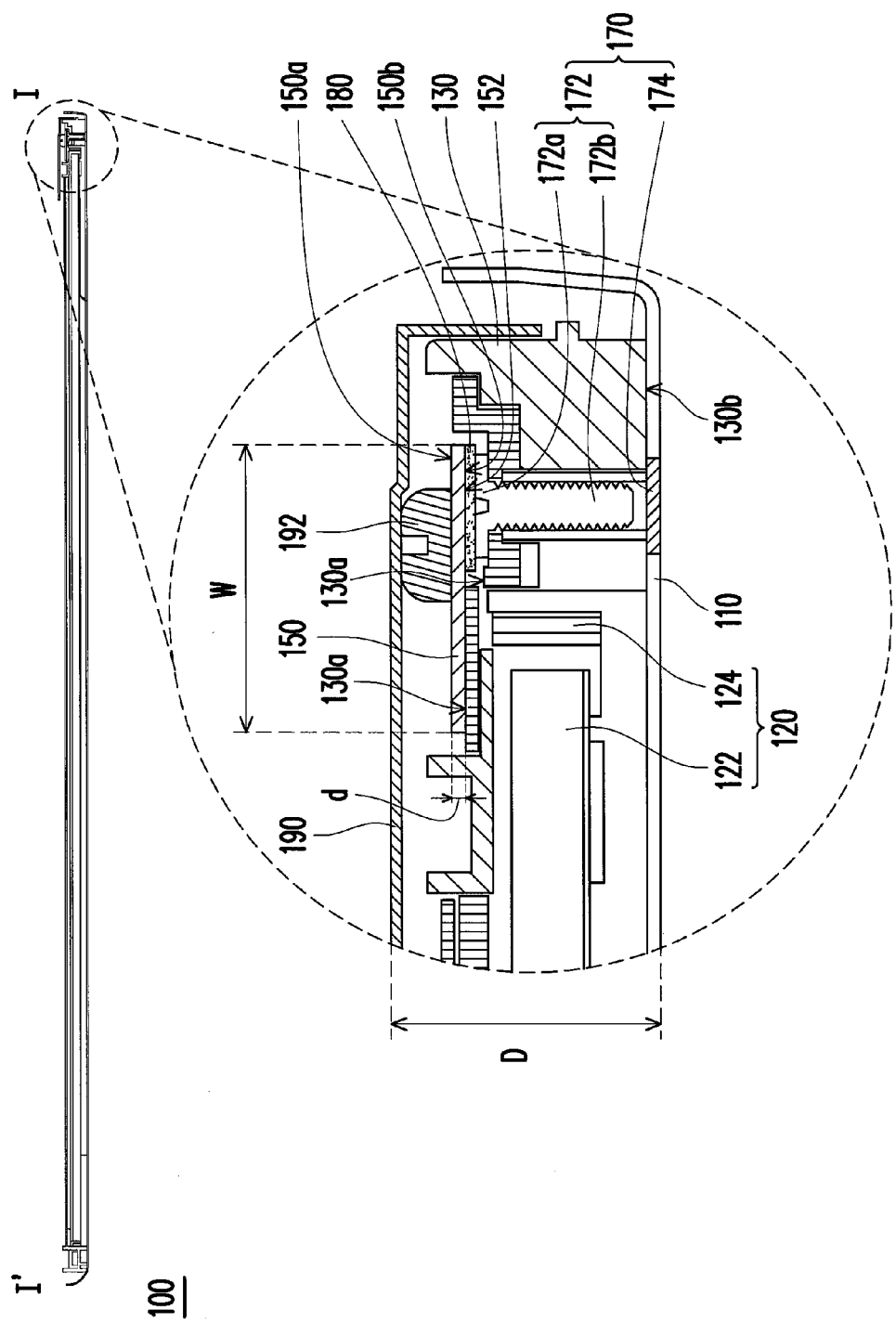
FIG. 2 is a schematic cross-sectional view illustrating the LCD module taken alone a sectional line I-I' depicted in FIG. 1.

FIG. 1 is a three-dimensional exploded view illustrating an LCD module 100 according to an embodiment of the invention. FIG. 2 is a schematic cross-sectional view illustrating the LCD module 100 taken alone a sectional line I-I' depicted in FIG. 1. With reference to FIG. 1 and FIG. 2, the LCD module 100 of this embodiment includes a back bezel 110, a backlight module 120, a frame 130, an LCD panel 140, a circuit board 150, an assembling element 170, and a gasket 180.

The back bezel 110 mainly carries and protects the elements configured thereon. Here, the back bezel 110 is preferably made of materials with favorable mechanical properties, high thermal conductivity, and great electrical conductivity, such as stainless steel, tinplate, or other appropriate materials.

The backlight module 120 is configured on the back bezel 110. In this embodiment, the backlight module 120 can include a light guide plate (LGP) 122 and a light emitting device 124, as shown in FIG. 2. It should be mentioned that the light emitting device 124 and the circuit board 150 of this embodiment are located at the same side of the LGP 122, so as to reduce the arrangement space. As such, the LCD module 100 of this embodiment complies with the requirement for the slim border design. Besides, the backlight module 120 can further include optical devices (not shown), e.g., a diffusion plate, an optical film set, and so on, so as to optimize optical properties of the LCD module 100. In this embodiment, the LGP 122 is made of methyl methacrylate (MMA) and polymethylmethacrylate (PMMA), for example, and the light emitting device 124 is a light emitting diode (LED) light bar, for instance, which should not be construed as limitations to this invention.

The frame 130 is configured on the back bezel 110 and surrounds the backlight module 120. Besides, the frame 130 has a top part 130a and a bottom part 130b opposite to the top part 130a. The bottom part 130b faces the back bezel 110, as shown in FIG. 1 and FIG. 2. The frame 130 mainly serves to hold the LCD panel 140 and can be made of plastic or other appropriate materials.

The LCD panel 140 is configured above the backlight module 120, and the top part 130a of the frame 130 leans against an edge of the LCD panel 140. That is to say, the LCD panel 140 is firmly configured above the backlight module 120 through leaning against the top part 130a of the frame 130. In this embodiment, the LCD panel 140 is a vertical alignment (VA) LCD panel, a twisted nematic (TN) LCD panel, or any other type of flat panel displays, for instance.

The circuit board 150 is configured on the top part 130a of the frame 130. Besides, the circuit board 150 has a first surface 150a and a second surface 150b opposite to the first surface 150a. The second surface 150b faces the frame 130. That is to say, a great portion of the second surface 150b of the circuit board 150 leans against the top part 130a of the frame 130 in this embodiment, such that the circuit board 150 is fixed to the top part 130a of the frame 130. Additionally, the circuit board 150 has a ground area 152, which is a ground pad, for instance. Namely, the ground pad is an exposed metal pad (e.g., an exposed copper pad), and thereby the circuit board 150 can be grounded. The ground area 152 is located on the second surface 150b of the circuit board 150 and faces the frame 130 for subsequently arranging a conductive path. The circuit board 150 of this embodiment is a source driving circuit board, a gate driving circuit board, or other circuit boards to be grounded.

The assembling element 170 pierces through the frame 130 and connects the frame 130 to the back bezel 110. In this embodiment, the assembling element 170 can further have a contact portion 172a exposed by the frame 130. For instance, the assembling element 170 can include a screw bolt 172 that has a head 172a, and the head 172a is exposed by the frame 130 and serves as the contact portion 172a. To be more specific, the screw bolt 172 can be divided into the head 172a and a branch 172b connected to the head 172a. The head 172a does not pass through a through hole H of the frame 130 and is exposed by the top part 130a of the frame 130, while the branch 172b passes through the through hole H of the frame 130.

The assembling element 170 can further include a screw nut 174 fixed to the back bezel 110, and the screw bolt 172 is locked to the screw nut 174. In particular, the screw nut 174 fixed to the back bezel 110 can be locked up with the branch 172b of the screw bolt 172 passing through the through hole H of the frame 130. Thereby, the frame 130 can be connected to the back bezel 110 through the assembling element 170.

The gasket 180 leans against the ground area 152 of the circuit board 150 and the contact portion 172a of the assembling element 170 to form a conductive path from the ground area 152, the gasket 180, the assembling element 170 to the back bezel 110. That is to say, the circuit board 150 of this embodiment leans against the top part 130a of the frame 130 and is grounded through the conductive path from the ground area 152, the gasket 180, the assembling element 170 to the back bezel 110. It is not necessary to place the circuit board 150 onto the back surface 110a of the back bezel 110; therefore, the required length of the electrical connection element 160 is not increased, and the material costs of the electrical connection element 160 are not raised. Under said arrangement, it is nor necessary to place the circuit board 150 close to the side surface 110b of the back bezel 110, such that the miniaturization of the thickness D of the LCD panel 140 is not subject to the width W of the circuit board 150. The gasket 180 of this embodiment mainly serves as an electrical connection bridge between the ground area 152 and the assembling element 170, and thus the gasket 180 can be any device with great conductivity, such as a conductive tape or the like.

The LCD module 100 of this embodiment can further include an electrical connection element 160 electrically connected between the LCD panel 140 and the circuit board 150. For instance, the electrical connection element 160 can be a flexible printed circuit (FPC). One end of the electrical connection element 160 is electrically connected to the data line of the LCD panel 140, while the other end is electrically connected to the circuit board 150, such that the circuit board 150 can drive the LCD panel 140 through the electrical connection element 160. It should be mentioned that the ground area 152 of this embodiment is configured on the second surface 150b of the circuit board 150, while the electrical connection element 160 is bonded to the first surface 150a of the circuit board 150. As such, more space on the circuit board 150 is available for arranging circuits that are required to be electrically connected to the electrical connection element 160. Namely, the circuit layout of the circuit board 150 is rather flexible.

Note that the electrical connection element 160 need not be overly bent under said arrangement. Hence, the possibility of damaging the electrical connection element 160 during assembly can be significantly reduced, and the assembly yield of the LCD module 100 can be remarkably improved. Moreover, the circuit board 150 is fixed in the LCD module 100 by leaning against the top part 130a of the frame 130 in this invention instead of being locked to the LCD module 100 according to the related art. Hence, the electrical connection element 160 is much less likely to be peeled off from the circuit board 150 during the vibration test.

Figure 3:
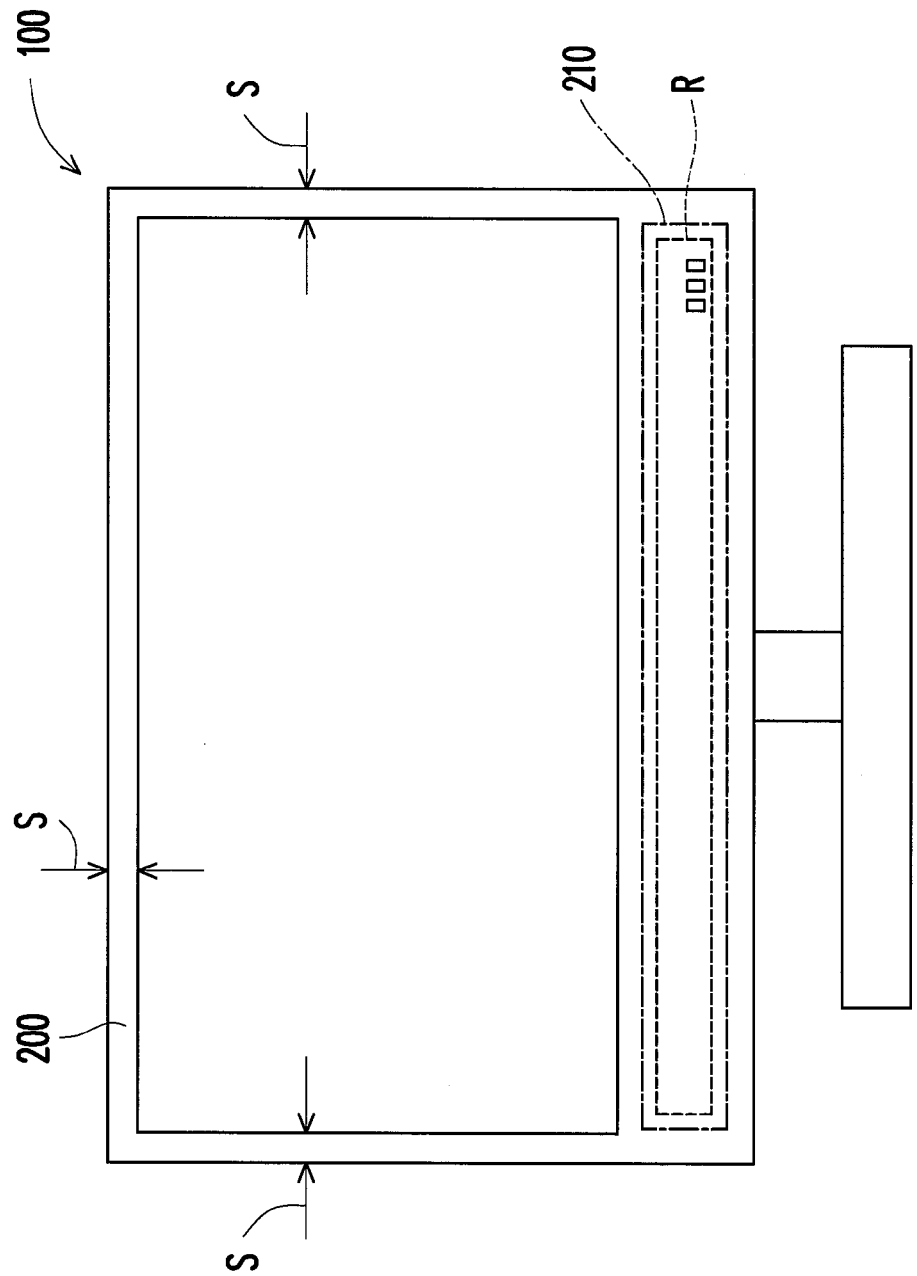
FIG. 3 is a schematic view illustrating an LCD module and an external module according to an embodiment of the invention.

It should be mentioned that the circuit board 150 of this embodiment is preferably placed in a region R of the LCD module 100, and the region R corresponds to an operating panel 210 of the external module 200, as shown in FIG. 3. Namely, the circuit board 150 is preferably placed at the back of the operating panel 210 of the external module 200, and thus the miniaturization of the border width S of the external module 200 is not subject to the width W of the circuit board 150.

Besides, the LCD module 100 of this embodiment further includes a front bezel 190 configured on the LCD panel 140. The LCD panel 140 and the circuit board 150 are held by the front bezel 190 and the frame 130 together. Namely, the front bezel 190 ensures that the LCD panel 140 and the circuit board 150 are firmly placed on the frame 130, and thereby the LCD module 100 of this embodiment can have favorable mechanical properties.

The LCD module 100 of this embodiment further includes a cushion element 192 leaning against the front bezel 190 and the circuit board 150. In this embodiment, the cushion element 192 is a rubber pad, for instance. Here, the cushion element 192 can ensure that the circuit board 150 is firmly supported by the front bezel 190 and the frame 130. Moreover, the cushion element 192 cushions the stress, such that the circuit board 150 is less likely to be damaged during the vibration test.

In light of the foregoing, the circuit board in the LCD module of the invention is configured on the top part of the frame, and the circuit board is grounded through the conductive path from the ground area, the gasket, the assembling element to the back bezel. Thereby, the LCD module of the invention can be easily miniaturized, and the issues of EMI and electrostatic discharge (ESD) barely occur.

Besides, the circuit board leans against the top part of the frame, and the frame holds the LCD panel. Thus, the length of the electrical connection element connecting the circuit board and the LCD panel need not be excessively long. As such, the material costs of the electrical connection element can be effectively reduced. On the other hand, the electrical connection element need not be overly bent under said arrangement. Hence, the possibility of damaging the electrical connection element can be significantly reduced. Meanwhile, the circuit board is not locked in the LCD module. As such, the electrical connection element is much less likely to be peeled off from the circuit board during the vibration test.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A liquid crystal display module comprising:
a back bezel;
a backlight module configured on the back bezel;
a frame configured on the back bezel and surrounding the backlight module, the frame having a top part and a bottom part opposite to the top part, the bottom part facing the back bezel;
a liquid crystal display panel configured above the backlight module, the top part of the frame leaning against an edge of the liquid crystal display panel;
a circuit board configured on the top part of the frame and having a first surface and a second surface opposite to the first surface, wherein the second surface faces the frame, and the circuit board has a ground area on the second surface;
an assembling element piercing through the frame and connecting the frame to the back bezel; and
a gasket leaning against the ground area of the circuit board and the assembling element to form a conductive path from the ground area, the gasket, the assembling element to the back bezel.

2. The liquid crystal display module as claimed in claim 1, further comprising an electrical connection element connected between the liquid crystal display panel and the circuit board.

3. The liquid crystal display module as claimed in claim 2, wherein the electrical connection element is bonded to the first surface of the circuit board.

4. The liquid crystal display module as claimed in claim 2, wherein the electrical connection element comprises a flexible printed circuit.

5. The liquid crystal display module as claimed in claim 1, further comprising a front bezel configured on the liquid crystal display panel, the front bezel and the frame together holding the liquid crystal display panel and the circuit board.

6. The liquid crystal display module as claimed in claim 5, further comprising a cushion element leaning against the front bezel and the circuit board.

7. The liquid crystal display module as claimed in claim 6, wherein the cushion element comprises a rubber pad.

8. The liquid crystal display module as claimed in claim 1, wherein the assembling element has a contact portion exposed by the frame.

9. The liquid crystal display module as claimed in claim 8, wherein the assembling element comprises a screw bolt having a head, and the head is exposed by the frame and serves as the contact portion.

10. The liquid crystal display module as claimed in claim 9, the assembling element further comprising a screw nut fixed to the back bezel, the screw bolt being locked onto the screw nut.

11. The liquid crystal display module as claimed in claim 1, wherein the backlight module comprises a light guide plate and a light emitting device, and the circuit board and the light emitting device are located at a same side of the light guide plate.

12. The liquid crystal display module as claimed in claim 1, wherein the ground area comprises a ground pad.

* * * * *